United States Patent [19]

Buxe

[11] Patent Number: 4,696,431

[45] Date of Patent: Sep. 29, 1987

[54] AUGMENTOR LINER SUPPORT BAND HAVING FINGER POSITIONERS

[75] Inventor: Paul M. Buxe, Lake Park, Fla.

[73] Assignee: United Technologies Corporation, Hartford, Conn.

[21] Appl. No.: 803,048

[22] Filed: Nov. 29, 1985

[51] Int. Cl.⁴ .............................................. B64D 33/04
[52] U.S. Cl. .............................. 239/265.15; 29/157 C; 60/752; 239/591
[58] Field of Search ....................... 239/265.39, 265.91, 239/455, 127.1, 127.3, 591, 265.15, 265.11; 29/455, 157 CX; 60/261, 752, 39.31, 39.32, 759, 760, 754; 138/113

[56] References Cited

U.S. PATENT DOCUMENTS

| 2,547,619 | 4/1951 | Buckland | 60/39.32 |
|---|---|---|---|
| 2,958,194 | 11/1960 | Bayley | 60/760 |
| 3,016,703 | 1/1962 | Lorett et al. | 60/752 |
| 3,032,974 | 5/1962 | Meyer | 239/127.3 |
| 3,043,103 | 7/1962 | Dent et al. | 29/157 C |
| 3,113,595 | 12/1963 | Cotman, Jr. | 138/113 |
| 3,589,128 | 6/1971 | Sweet | 60/759 X |
| 3,742,703 | 7/1973 | Melconian | 60/760 X |
| 3,793,827 | 2/1974 | Ekstedt | 60/759 X |
| 4,171,093 | 10/1979 | Honeycutt | 239/127.3 |

FOREIGN PATENT DOCUMENTS

| 2271405 | 12/1975 | France . | |
|---|---|---|---|
| 892885 | 4/1962 | United Kingdom | 60/39.32 |

Primary Examiner—Andres Kashnikow
Assistant Examiner—Daniel R. Edelbrock
Attorney, Agent, or Firm—Jack N. McCarthy

[57] ABSTRACT

An augmentor liner support band is formed having finger positioners for connecting the support band to an augmentor liner; the support band being formed of three built-up ribbons, or strips, or sheet metal, one inner ribbon having spaced fingers extending therefrom; a second and middle ribbon being corrugated; and a third plain outer ribbon extending around the corrugated ribbon forming a rigid band. The inner ribbon is circumferentially spaced from an augmentor liner while the free ends of the extending fingers are attached to an axially spaced part of the augmentor liner.

13 Claims, 5 Drawing Figures

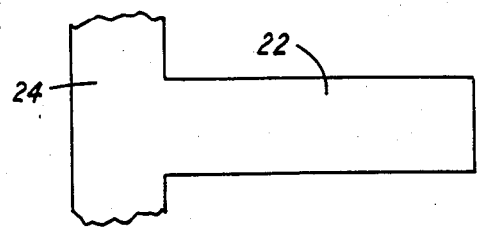
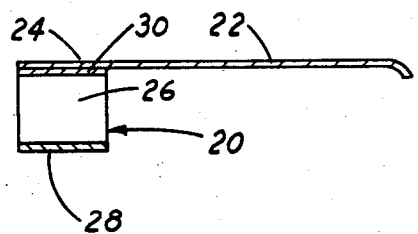
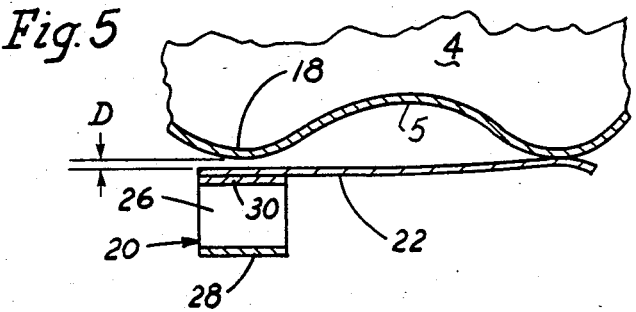
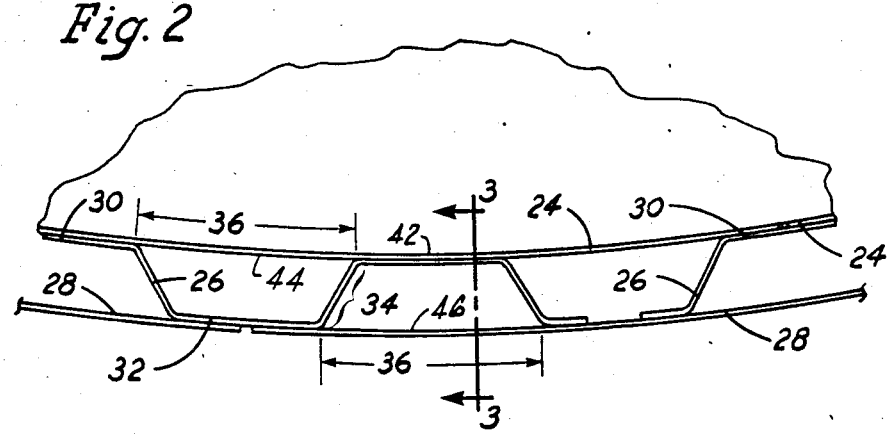

AUGMENTOR LINER SUPPORT BAND HAVING FINGER POSITIONERS

DESCRIPTION

1. Technical Field

This invention relates to finger positioners for properly placing a support band around a protective liner subjected to extreme pressures and temperatures, especially a protective liner of an augmentor duct for a jet engine, and method of fabrication.

2. Background Art

A liner for a hot flow duct, such as an augmentor duct for a jet engine, a combustion chamber, and an exhaust duct, is well known in the art and these liners have been supported and strengthened in many ways. Patents showing liners supported in augmentors, combustion chambers, and exhaust ducts are the following: U.S. Pat. Nos. 2,910,828; 3,826,088; 3,866,417; 4,380,896; 4,456,178; and French Pat. No. 7342949 (publication No. 2,271,405).

In a previous construction of an augmentor liner support band, the positioner was a conical section with cylindrical ends, the smaller of the cylindrical ends being formed to fit on the augmentor liner by a close tolerance for welding, or riveting, thereon, the conical section being formed extending outwardly from the smaller end at a precise angle to place the larger of the cylindrical ends having a corrugated spacer strip and inner strip at an exact distance spaced from the augmentor liner, said distance being calculated knowing working parameters of the augmentor, such as temperatures and pressures, and metal of the augmentor liner and positioner. A band would be formed around the larger cylindrical end to support the augmentor liner during operation as it grew thermally to contact the band. Said conical section had holes therein.

DISCLOSURE OF INVENTION

An object of this invention is to provide finger positioners for connecting a support band to an augmentor liner.

Another object of this invention is to provide inexpensive positioning fingers for connecting a support band to an augmentor liner which also provide a lightweight structure.

A further object of this invention is to provide a support band for a liner having positioning fingers permitting an improved cooling air distribution to the liner.

Another object of this invention is to provide a support band with finger positioners which can be easily fabricated for liners of different diameters reducing manufacturing costs. In just one jet engine having an augmentor, the liner can need support bands of different diameters in view of (1) the varying circumference of the liner from one end to the other; and (2) the operational temperature gradient reached within the liner from one end to the other. This temperature gradient changes the spaced distance required between the fabricated liner and support band, even for liners having the same circumference.

A further object of this invention is to provide (1) an elongated length of ribbon of sheet metal having spaced fingers extending therefrom for forming the inner ring of the support band from which one or more support bands can be made; (2) an elongated length of plain ribbon of sheet metal for forming the outer ring of the support band from which one or more support bands can be made; and (3) an elongated length of corrugated ribbon of sheet metal for placing between the inner and outer ring to fabricate a rigid band from which one or more support bands can be made.

Another object of this invention is to provide a fabricating cylinder having a diameter which is equal to the diameter of the augmentor liner where the support band with finger positioners will be placed in actual installation, plus an allowance for desired liner growth, for use in fabricating the support band with finger positioners as follows:

(1) the ribbon of sheet metal having the spaced fingers is placed around the cylinder and cut at the proper length and held in place;

(2) the corrugated ribbon of sheet metal is placed around the ribbon of sheet metal having the spaced fingers and cut at the proper length, and welded in place at its mating locations with the ribbon of sheet metal having the spaced fingers; and (3) the plain ribbon of sheet metal is placed around the corrugated ribbon of sheet metal and cut at the proper length, and welded in place to the mating locations with the corrugated ribbon of sheet metal;

where a plurality of liner support bands of equal size are needed, the lengths of all of the different ribbons of sheet metal are calculated and cut, or made, to the size desired first and then formed into their circular contour and fixed together.

A further object of this invention is to provide for fabricating a liner support band having finger positioners of three layers of ribbons of sheet metal:

(1) one inside ribbon having spaced fingers extending therefrom;

(2) one middle ribbon being corrugated; and (3) one outside plain ribbon; where the finger positioners can extend from either side of the liner support band by merely reversing the position of the inside ribbon having spaced fingers during fabrication. This permits a band to have its fingers extend either upstream or downstream.

Another object of this invention is to provide the ribbon of sheet metal having spaced fingers with long fingers which can be cut to a desired length for use on augmentor liners having differently spaced corrugations.

A further object of this invention is to have the individual ribbons of sheet metal individually formed to their precise length to form the circumference needed; with these ribbons one can form the liner support band without a fabricating cylinder, and other expensive tooling.

Another object of this invention is to provide the ribbon of sheet metal with spaced fingers which are flexible so that they can flex for attachment to an augmentor liner. These flexible fingers also permit the augmentor liner to grow during engine operation where the fingers are fixed thereto without unduly loading the liner.

A further object of this invention is to provide easier installation of a support band and positioner at a midpoint of an augentor liner where the support band and positioner must be traversed over a plurality of annular corrugations; a cylindrical positioner sized to be approximately the diameter of several of the annular corrugations would be difficult to slide over a plurality of the corrugations, to reach its required location, due to manufacturing production variations on sheet metal parts of this size.

BRIEF DESCRIPTION OF DRAWINGS

FIG. 2 is a view of a circumferential section of a liner support band on a part of a fabricating cylinder;

FIG. 3 is a view on the line 3—3 of FIG. 2, with the fabricating cylinder removed showing the support band with a finger positioner;

FIG. 4 is a view from the top of FIG. 3 showing the spaced finger positioners; and FIG. 5 is a view of a section of a liner showing the location of a support band thereon with the support band spaced from an outwardly extending corrugation and a finger flexed inwardly and fixed to an adjacent outwardly extending corrugation.

BEST MODE FOR CARRYING OUT THE INVENTION

Figure 1:
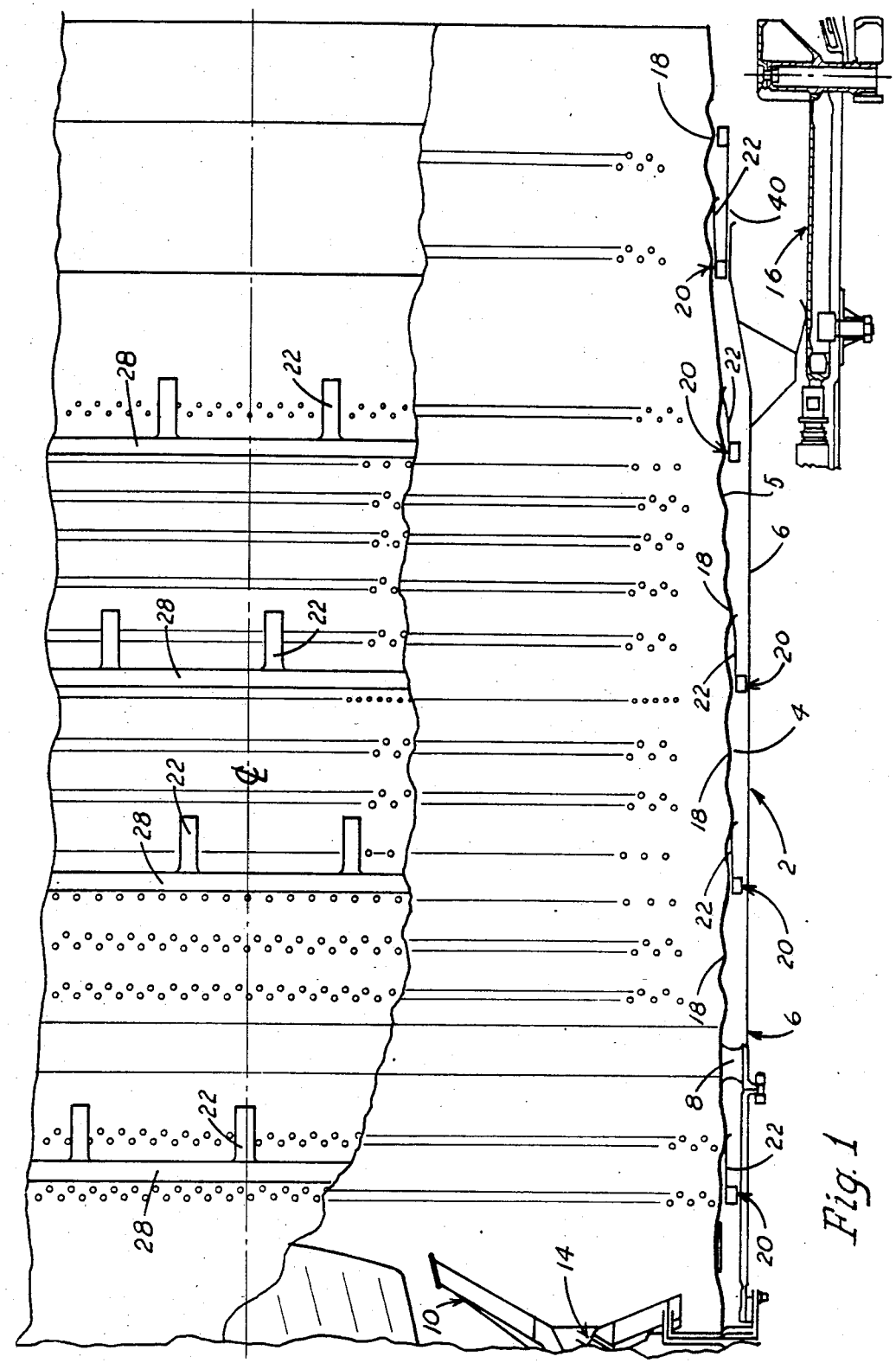
FIG. 1 is a view of a portion of an augmentor of a jet engine showing the augmentor liner; the lower part shows the interior of the augmentor including a plurality of liner support bands between the liner and augmentor casing; the upper part shows the exterior of the liner with the casing removed.

An augmentor 2 for a jet engine is shown in FIG. 1 having an augmentor liner 4 therein having an outer surface 5 (see FIG. 5), said augmentor liner 4 being supported in an augmentor casing 6 by circumferential support means 8. A flameholder 10, igniter 14, and fuel injection means (not shown) are located at the upstream end of the augmentor liner 4; a jet engine (not shown) is located upstream of said augmentor 2, and an exhaust nozzle assembly, partially shown by a portion of the actuation system 16, is located at the downstream end of the augmentor casing 6. While only a portion of the nozzle assembly is shown, more detail is shown in U.S. Pat. No. 4,456,178.

The augmentor liner 4, generally made from thin sheet metal to provide a lightweight design, is strengthened by a plurality of circumferential corrugations 18. However, to reduce the loads placed into the augmentor liner 4 by high pressures and temperatures during operation, a circumferential support band 20 is placed at axially spaced locations along the length of the augmentor liner 4. Each circumferential support band 20 is placed around the augmentor liner 4 at a predetermined axial position with each support band 20 having an inner circumferential surface spaced from an outer surface 5 of an outwardly extending corrugation 18 of said augmentor liner 4 by a gap "D"; each support band 20 being fixed to said augmentor liner 4.

An augmentor liner support band 20 is formed having axially extending fingers 22 for connection to said augmentor liner 4 at an outer surface 5 spaced from said liner surface which is radially aligned with said support band. The gap "D" closes down during engine operation due to thermal growth and the augmentor liner 4 contacts the inner circumferential surface of each augmentor liner support band 20 to load the liner 4 in a proper manner. A gap "D" is calculated knowing the growth of the augmentor liner 4 during engine operation. The precise gap "D" at a specific axial location on said augmentor liner can be calculated by one skilled in the art.

An augmentor liner support band 20 having finger positioners 22 is fabricated for a specific location along an augmentor liner having substantially equally spaced corrugations 18 by:

(1) forming a long ribbon, or strip, 24 of sheet metal having spaced fingers 22, said fingers being of a length to extend across two outwardly extending corrugations 18;

(2) forming a long corrugated ribbon, or strip, 26 of sheet metal, said corrugations of said ribbon 26 each having flat spaced surfaces 30 on one side and flat spaced surfaces 32 on the other side, with straight interconnecting portions 34. The straight portions 34 are angled to provide a spacing 36 longer than the length of the flat surfaces 30 and 32;

(3) forming a long plain ribbon, or strip, 28 of sheet metal;

(4) knowing the diameter of the augmentor liner 4 where a support band 20 is to be placed, the distance 2D is added to the known diameter, providing the desired inner diameter of the support band 20. The desired inner circumference can then be calculated;

(5) measuring a length of ribbon 24 of sheet metal, having spaced fingers 22, equal to the desired inner circumference for a support band 20;

(6) measuring a length of corrugated ribbon 26 of sheet metal equal to the circumference around ribbon 24;

(7) measuring a length of plain ribbon 28 of sheet metal equal to the circumference around the corrugated ribbon 26;

(8) forming a fabricating cylinder having an outer circumference equal to the desired inner circumference of a support band 20;

(9) placing the length of ribbon 24 of sheet metal, having spaced fingers 22 and an inner surface 42 around the fabricating cylinder;

(10) holding said ribbon 24 in place by well known means;

(11) placing the length of corrugated ribbon 26 around the ribbon 24 with surfaces 30 engaging the outer surface 44 of ribbon 24;

(12) holding said corrugated ribbon 26 in place by well known means;

(13) placing the length of plain ribbon 28 around the corrugated ribbon 26 with an inner surface 46 of ribbon 28 engaging the surfaces 32;

(14) holding said plain ribbon 28 in place by well known means;

(15) fixing (such as by welding or brazing) said ribbons 24, 26 and 28 of sheet metal together forming a support band 20 having finger positioners 22; and

(16) removing said support band 20 from the fabricating cylinder.

To install said support band 20 on an augmentor liner, place the end of inner ribbon 24 over the desired outwardly extending corrugation 18, centering said support band 20 around said augmentor liner 4 and then fixing the free ends of the spaced fingers 22 to the adjacent outwardly extending corrugation 18, said finger positioners 22 flexing if necessary. It is noted that FIG. 5 shows an example where the finger positioners 22 were flexed inwardly.

In FIG. 1, five (5) circumferential support bands 20 are shown positioned by fingers 22. The rearwardmost support band 20 has a long rearwardly extending cylinder 40 in place of the plain ribbon 28 of the other four support bands 20. This cylinder 40 has a corrugated ribbon 26 fixed within its rearward end, with a plain ribbon fixed within the corrugated ribbon 26. The interior of the plain ribbon is spaced outwardly, by its calculated distance "D", from the last outwardly extending corrugation 18 to provide additional support. It is noted that the temperatures in this area of the augmentor liner 4 are very extreme. The long rearwardly extending cylinder 40 is used to direct cooling fluid flowing rearwardly between the augmentor casing 6 and augmentor liner 4 against the rear end of the augmentor liner 4.

I claim:

1. An augmentor liner having an outer surface for a jet engine; an augmentor liner support band being located around the outer surface of the augmentor liner; said support band having an inner strip with an inner surface spaced from the outer surface of the liner, an outer strip spaced from said inner strip, and a corrugated strip located between said inner strip and outer strip; means fixing said strips together, said corrugated strip permitting flow through said support band; said inner strip having a plurality of axially extending flexible fingers for fixing said support band in place; said axially extending flexible fingers permitting flow therebetween; each axially extending flexible finger being fixedly attached to an axially spaced portion of said augmentor liner.

2. An augmentor liner as set forth in claim 1 wherein said liner has annular corrugations spaced axially along its outer surface, said inner strip being spaced from the outer surface of one outwardly curved annular corrugation.

3. An augmentor liner as set forth in claim 2 wherein each axially extending flexible finger is attached to the outer surface of a second corrugation of said augmentor liner, said flexible fingers permitting growth of said augmentor liner during engine operation without placing an undue load on said augmentor liner.

4. An augmentor liner as set forth in claim 3 wherein said inner strip is spaced a predetermined distance from the outer surface of said one corrugation, said distance permitting said augmentor liner to grow to rest against said augmentor liner support band during engine operation.

5. A method of fabricating an augmentor liner support band having finger positioners, including
(1) forming a strip of metal having short flexible finger strips at a desired length to obtain a desired circumference;
(2) forming a corrugated strip of metal at a desired length to obtain a desired circumference;
(3) forming a plain strip of metal at a desired length to obtain a desired circumference;
(4) forming said strip of metal having short finger strips into a cylinder;
(5) forming said corrugated strip of metal into a cylinder engaging the strip of metal of said strip of metal having short finger strips;
(6) forming said plain strip of metal into a cylinder engaging the corrugated strip of metal; and
(7) fixing said cylindrical strips of metal together forming a support band having finger positioners.

6. A method as set forth in claim 5 wherein in step (4) a fabricating cylinder is formed having an outer circumference equal to the desired inner circumference of a support band, said strip of metal having short finger strips being formed into a cylinder around said fabricating cylinder and held in place.

7. A method of fabricating an augmentor liner support band having finger positioners as set forth in claim 5,
wherein Step (1) an elongated length of a strip of metal having short flexible finger strips is first formed and a strip of metal having short flexible finger strips is cut therefrom at a desired length;
wherein Step (2) an elongated length of a corrugated strip of metal is first formed and a corrugated strip of metal is cut therefrom at a desired length; and
wherein Step (3) an elongated length of a plain strip of metal is first formed and a plain strip of metal is cut therefrom at a desired length.

8. A method of fabricating an augmentor liner with a support band having finger positioners, including
(1) forming an augmentor liner having an outer surface with a desired outer circumference at one location;
(2) forming a strip of metal having short flexible finger strips at a desired length to obtain a desired inner circumference larger than the desired outer circumference of said augmentor liner;
(3) forming a corrugated strip of metal at a desired length to obtain a desired circumference;
(4) forming a plain strip of metal at a desired length to obtain a desired circumference;
(5) forming said strip of metal having short finger strips into a cylinder having the desired inner circumference;
(6) forming said corrugated strip of metal into a cylinder engaging the strip of metal of said strip of metal having short finger strips;
(7) forming said plain strip of metal into a cylinder engaging the corrugated strip of metal;
(8) fixing said cylindrical strips of metal together forming a support band having finger positioners and the desired inner circumference;
(9) spacing the desired inner circumference of the support band around the desired outer circumference of said augmentor liner; and
(10) fixing the short flexible metal strips to the surface of the augmentor liner thereby fixing the support band around the desired outer circumference of the augmentor liner.

9. A method of fabricating an augmentor liner as set forth in claim 8 wherein;
in Step (1) forming said outer surface having annular corrugations along its outer surface;
in Step (2) forming said desired outer circumference as the outer circumference of one annular corrugation;
in Step (9) spacing said desired inner circumference of the support band around the one annular corrugation; and
in Step (10) fixing the short flexible metal strips to another annular corrugation.

10. An augmentor liner having an outer surface for a jet engine; a plurality of axially spaced circumferential locations along the length of the augmentor liner; a plurality of augmentor liner support bands; an augmentor liner support band being positioned at each axially spaced circumferential location; each support band having an inner strip with an inner surface spaced from the outer surface of the liner, an outer strip spaced from said inner strip, and a corrugated strip located between said inner strip and outer strip; means fixing said strips together; each corrugated strip permitting flow through each support band; each inner strip having a plurality of axially extending flexible fingers for fixing each support band in place; said axially extending flexible fingers permitting flow therebetween; each axially extending flexible finger being fixedly attached to an axially spaced portion on the surface of said augmentor liner.

11. An augmentor liner as set forth in claim 10 wherein said liner has annular corrugations spaced axially along its outer surface; each augmentor liner support band having the inner surface of its inner strip spaced from the outer surface of one annular corrugation and the axially extending flexible fingers being fixedly attached to another annular corrugation.

12. A method of fabricating an augmentor liner support band having finger positioners, including
   (1) forming a strip of metal having short flexible finger strips at a desired length to obtain a desired circumference;
   (2) forming a corrugated strip of metal at a desired length to obtain a desired circumference;
   (3) forming a plain strip of metal at a desired length to obtain a desired circumference;
   (4) forming said strip of metal having short finger strips into a cylinder having an inner and outer surface;
   (5) forming said corrugated strip of metal into a cylinder having an inner and outer surface, said inner surface of said corrugated strip cylinder engaging said outer surface of said strip of metal cylinder of said strip of metal having short finger strips;
   (6) forming said plain strip of metal into a cylinder having an inner and outer surface, said inner surface of said plain strip of metal cylinder engaging said outer surface of said corrugated strip of metal; and
   (7) fixing said cylindrical strips of metal together forming a support band having finger positioners.

13. An augmentor liner support band for a jet engine augmentor liner having an outer surface; said support band having an inner strip with an inner surface for spacing from the outer surface of the liner, an outer strip spaced from said inner strip, and a corrugated strip located between said inner strip and outer strip; means fixing said strips together, said corrugated strip permitting flow through said support band; said inner strip having a plurality of axially extending flexible fingers for fixing said support band in place to an axially spaced portion of an augmentor liner; said axially extending flexible fingers permitting flow therebetween.

* * * * *